March 6, 1962 N. A. RUSSELL 3,023,785
DIAPHRAGM WITH STIFFENER
Filed Sept. 30, 1960

INVENTOR.
NORTON A. RUSSELL,
BY
ATTORNEYS.

United States Patent Office 3,023,785
Patented Mar. 6, 1962

3,023,785
DIAPHRAGM WITH STIFFENER
Norton A. Russell, Yellow Springs, Ohio, assignor to Vernay Laboratories, Inc., Yellow Springs, Ohio, a corporation of Ohio
Filed Sept. 30, 1960, Ser. No. 59,535
5 Claims. (Cl. 137—793)

This invention relates to a diaphragm and more particularly to a diaphragm having a plane area of substantial size which is desirably maintained in flat condition during operaton of the diaphragm. More particularly, it relates to a method of molding such a diaphragm with a stiffening member and to a diaphragm as an article of manufacture having molded thereinto a stiffening member.

Objects of the invention, therefore, include the provision of a method for molding a rubber diaphragm onto a stiffening plate in such a way as to make it less likely that the plate will be thrown off from the diaphragm and to provide a diaphragm having rivet-like elements through holes in a stiffening plate with a plurality of said rivet-like elements having a common head.

These and other objects of the invention which will be pointed out in more detail hereinafter or which will be apparent to one skilled in the art upon reading these specifications, I accomplish by that certain construction and arrangement of parts of which I shall now describe an exemplary embodiment.

Reference is made to the drawing forming a part hereof and in which.

Briefly, in the practice of the invention, I mold the rubber diaphragm against one side of a stiffening plate having a plurality of holes therein and provide in the opposite mold member a groove communicating with said holes so that during the molding operation the rubber of the diaphragm is forced through the holes and into a manifold of sorts whereby the stiffener plate is in effect riveted to the diaphragm by a series of rubber rivets having common heads, the heads on one side being constituted by the diaphragm itself and on the other side by a ribbon or the like of rubber.

Figure 1:
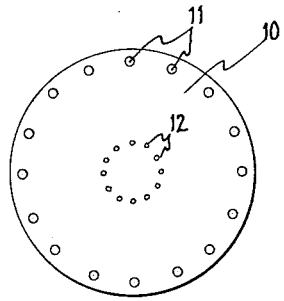
FIGURE 1 is a plan view of a stiffening plate.
Figure 2:
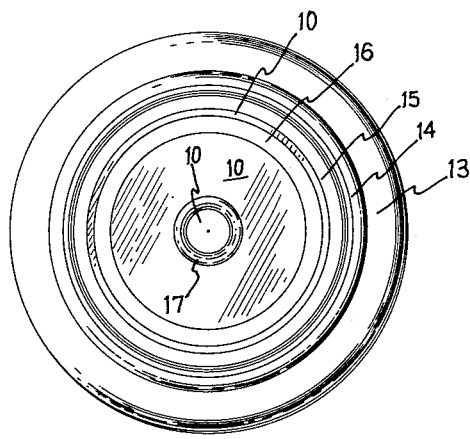
FIGURE 2 is a plan view of the assembled stiffening plate and diaphragm.

Referring now in more detail to the drawing, I have shown in FIGURE 1 a typical stiffening plate for a circular diaphragm. The plate is indicated at 10 and is provided with a peripheral series of holes 11 and an inner series of holes 12. The diaphragm itself with the stiffening plate in position is shown in FIGURE 2 and it comprises an annular flange portion 13, a U-shaped thin portion 14 capable of flexing readily, and a flat portion 15.

At 16 there is shown an annular ribbon of rubber which interconnects the rubber rivet-like elements formed by rubber being forced through the holes 11 and at 17 is shown another rubber ribbon or ring formed from the rubber of the material which is forced through the holes 12 and connects the rivet-like members passing through said holes.

Figure 3:
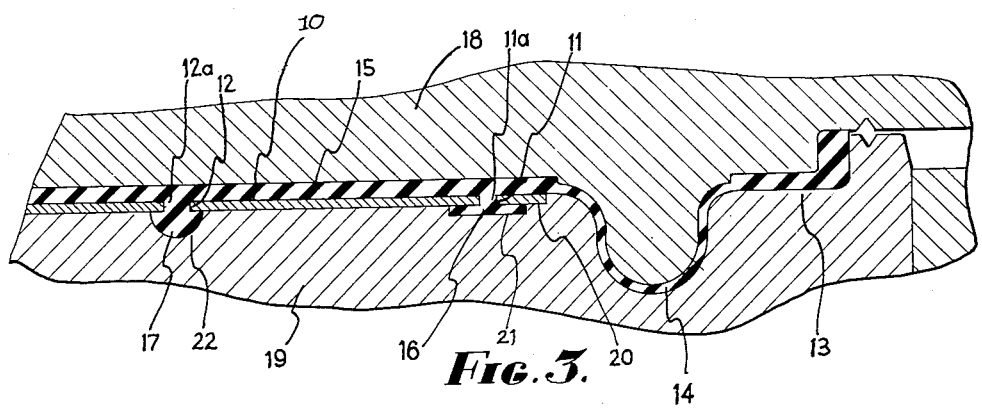
FIGURE 3 is a fragmentary cross-sectional view through a pair of cooperating die members showing how the elements are molded together.

In FIGURE 3 I have shown, on an enlarged scale and a fragmentary way, an upper mold member 18 cooperating with a lower mold member 19 to form the diaphragm. The parts are numbered as they were in FIGURE 2. It will be observed that in addition to the configuration required to form the diaphragm, the lower mold member is provided with a rabbeted configuration at 20 which constitutes a seat for the stiffening plate 10. Additionally, the lower mold member 19 is provided with the groove 21 which is circular and the groove 22 which is also circular. The groove 21 is so located that the holes 11 in the plate 10 all communicate therewith and the groove 22 is so located that the holes 12 in the plate 10 all communicate therewith.

It will now be clear that when the mold is closed and rubber or rubber-like material is injected thereinto, the rubber will flow into the mold cavity to form the diaphragm itself and will flow through the holes 11 and 12 forming the rivet-like elements 11a and 12a and into the grooves 21 and 22 to form the continuous ribbons or rivet heads 16 and 17.

In this way, the stiffening plate is securely fastened to the diaphragm and there are no individual rubber buttons or rivet heads which can become torn or otherwise destroyed. There are simply the concentric annular ribbons which have no fee ends.

While the stiffening plate is usually metallic, it will be understood that it may be of any suitable material without departing from the spirit of the invention. Likewise, the diaphragm itself may be made of rubber or rubber-like materials which includes the various artificial rubbers and copolymers.

It will be clear that various modifications may be made without departing from the spirit of the invention and I therefore do not intend to limit myself otherwise than as set forth in the claims which follow.

Having now fully described the invention, what I claim as new and desire to secure by Letters Patent is:

1. A diaphragm of rubber having a stiffening plate secured thereto, said stiffening plate having a plurality of holes therein and being secured to said diaphragm by elements of the rubber material of said diaphragm which passes through said holes in the form of plugs, said plugs being interconnected on the side of said plate opposite said diaphragm by an element of the rubber material of said diaphragm.

2. A diaphragm of rubber having a stiffening plate secured thereto, said stiffening plate having a plurality of holes therein disposed in a circle and being secured to said diaphragm by elements of the rubber material of said diaphragm which passes through said holes in the form of plugs, said plugs being interconnected on the side of said plate opposite said diaphragm by a circular element of the rubber material of said diaphragm.

3. A diaphragm of rubber having a stiffening plate secured thereto, said stiffening plate having a plurality of holes therein disposed in a plurality of concentric circles and being secured to said diaphragm by elements of the rubber material of said diaphragm which passes through said holes in the form of plugs, said plugs being interconnected on the side of said plate opposite said diaphragm by a plurality of concentric circular elements of the rubber material of said diaphragm.

4. A circular diaphragm of rubber having a stiffening plate secured thereto, said stiffening plate having a plurality of holes therein disposed in a circle and being secured to said diaphragm by elements of the rubber material of said diaphragm which passes through said holes in the form of plugs, said plugs being interconnected on the side of said plate opposite said diaphragm by a circular element of the rubber material of said diaphragm.

5. A circular diaphragm of rubber having a stiffening plate secured thereto, said stiffening plate having a plurality of holes therein disposed in a plurality of concentric circles and being secured to said diaphragm by elements of the rubber material of said diaphragm which passes through said holes in the form of plugs, said plugs being interconnected on the side of said plate opposite said diaphragm by a plurality of concentric circular elements of the rubber material of said diaphragm.

References Cited in the file of this patent

UNITED STATES PATENTS

| | | |
|---|---|---|
| 2,456,615 | Berglund | Dec. 21, 1948 |
| 2,572,438 | Branson | Oct. 23, 1951 |
| 2,638,127 | Griswald | May 12, 1953 |
| 2,869,585 | Baker | Jan. 20, 1959 |